(No Model.)
G. H. OGDEN.
COVER FOR WAY BILLS, &c.
No. 418,815. Patented Jan. 7, 1890.
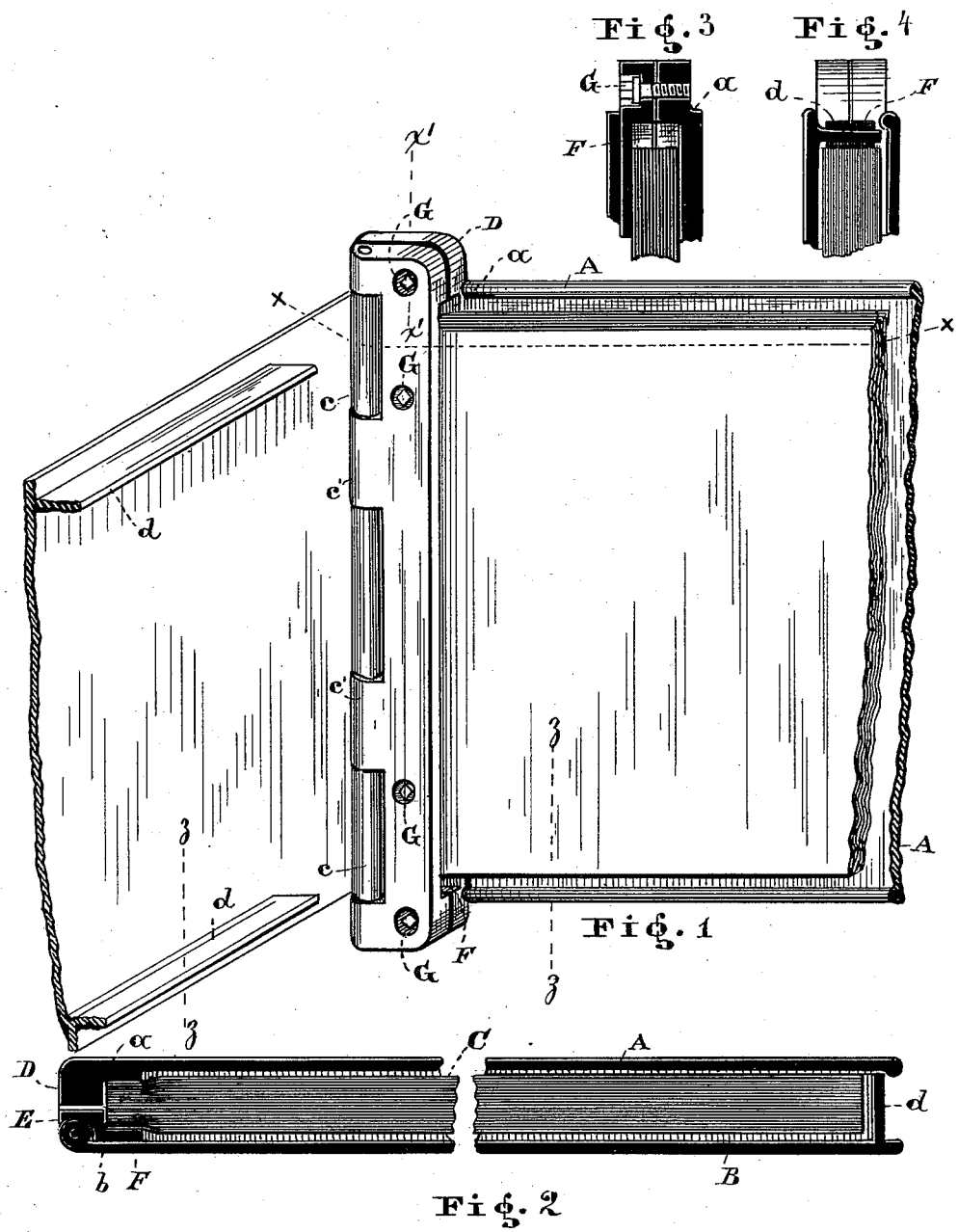
WITNESSES
G. H. C. Ober.
Frank Higley
INVENTOR
G. H. Ogden
W. H. Burridge
Atty

# UNITED STATES PATENT OFFICE.

GEORGE H. OGDEN, OF CLEVELAND, OHIO, ASSIGNOR OF ONE-THIRD TO CHARLES S. BRITTON, OF SAME PLACE.

COVER FOR WAY-BILLS, &c.

SPECIFICATION forming part of Letters Patent No. 418,815, dated January 7, 1890.

Application filed September 7, 1888. Serial No. 284,837. (No model.)

*To all whom it may concern:*

Be it known that I, GEORGE H. OGDEN, of Cleveland, in the county of Cuyahoga and State of Ohio, have invented new and useful Improvements in Adjustable Protecting-Covers for Way-Bills, Shipping-Bills, and other Similar Purposes; and I hereby declare that the following is a full, clear, and exact description thereof.

The protecting-covers may be of various sizes for the purpose above stated; and the improvement consists in the construction and arrangement thereof in connection with way-bills, shipping-bills, and numerous other blank forms used in and for the traffic and transportation of goods or merchandise.

The object of said invention is to protect said bills or "blanks" against the hard or rough usage to which they are exposed, as well as the influences of the weather and other injurious incidents to which they are subjected while in or out of use.

Another object is to so unite or bind said bills or blanks that any or all leaves may readily be taken from out said covers and new ones put in place thereof, or additions may be made without disturbing those already attached.

That the improvement may be fully understood, reference will be had to the following specification and the accompanying drawings, in which—

Figure 1 is a partial perspective view of the adjustable binding-covers, having the lid partly lifted therefrom. Fig. 2 is a horizontal section of said covers on line $x\ x$ of Fig. 1, with leaves between or bound by the covers. Fig. 3 is a partial vertical section on line $x'\ x'$ of Fig. 1; and Fig. 4 is a partial vertical section on line $z\ z$, Fig. 1.

Like letters of reference denote like parts in the drawings and specification.

A and B are the covers above referred to, and C the leaves or blanks, which are secured to the bar D of the cover A by means of the bar E. These bars form the back of said covers or book. The leaves are placed into the cavity F, which is formed by the recesses $a$ and $b$ at the inner sides of the bars D and E, and are bound by means of screws G, which unite said bars. The heads of said screws are countersunk into the bar D, and the shank of the screw is threaded into the bar D, as seen in Figs. 1 and 3. Said screws allow of adjustment of the bars E and D in relation to each other for the purpose of binding more or less leaves between them. The number and location of said screws depend upon the size and form of the leaves to be bound, and they can or may be placed equally as well inside the covers, as shown at G', as outside thereof, or the bars E and D may be made even with the covers and the inside screws G' G' used only. If the screws are attached inside of the book, as indicated at G', then the leaves or blanks are notched or punched out at that particular place. The screws are preferably provided with a so-called "plug-head," thus rendering the bars D and E only separable by means of a key expressly fitted over said head in the countersinks. The cover B is connected with the bar E by means of the hinges $c$ and $c'$, as seen in Figs. 1 and 2, and for books which are more or less exposed to the influences of the weather said cover is provided with flanges $d$, (see Figs. 2 and 4,) which exclude the rain and snow to which at times they may be exposed. The said flanges $d$ may be used or not used without departing from the nature of this invention. The flanged cover is of material utility and advantage in protecting the book-leaves from the effects of weather and atmosphere when exposed to outdoor use. The leaves, when written up, can readily be taken out and filed for record, while the covers or casing, respectively, will serve for future use. It is preferred to use a metallic covering or casing for this purpose, thus rendering it more durable. Other suitable material may be, however, used for the covers.

What I claim, and desire to secure by Letters Patent, is—

1. In combination with covers for shipping and way bills, the back consisting of the bars D and E, said bars having recesses $a\ b$ to receive the leaves, and clamping-screws G to bind said leaves between said bars, having the cover A, secured to the bar D, and cover B, hinged to bar E, in the manner substantially as described, and for the purpose set forth.

2. The combination of cover A, flanged cover B, bars D E, having recesses $a$ $b$, and clamping-screws G, all constructed and arranged substantially as and for the purpose described.

3. In covers for way and shipping bills, the back thereof adjustably constructed and arranged to receive more or less amount of blanks by means of recesses on the inner side of bars forming said back, and clamping-screws uniting the bars, in combination with flanged covers of said bars, substantially as and for the purpose set forth.

In testimony whereof I affix my signature in presence of two witnesses.

GEORGE H. OGDEN.

Witnesses:
W. H. BURRIDGE,
B. F. EIBLER.